US008971374B2

United States Patent
Scholz

(10) Patent No.: US 8,971,374 B2
(45) Date of Patent: Mar. 3, 2015

(54) DEVICE FOR GENERATING ELECTROMAGNETIC RADIATION

(71) Applicant: TOPTICA Photonics AG, Graefelfing (DE)

(72) Inventor: Matthias Scholz, Munich (DE)

(73) Assignee: TOPTICA Photonics AG, Graefelfing (DE)

( * ) Notice: Subject to any disclaimer, the term of this patent is extended or adjusted under 35 U.S.C. 154(b) by 0 days.

(21) Appl. No.: 14/034,926

(22) Filed: Sep. 24, 2013

(65) Prior Publication Data
US 2014/0086269 A1    Mar. 27, 2014

(30) Foreign Application Priority Data

Sep. 25, 2012 (DE) .......... 10 2012 018 815
Jan. 24, 2013 (DE) .......... 10 2013 001 177

(51) Int. Cl.
*H01S 3/081* (2006.01)
*H01S 3/109* (2006.01)
*G02F 1/35* (2006.01)
*G02B 27/12* (2006.01)

(52) U.S. Cl.
CPC .............. *H01S 3/109* (2013.01); *G02F 1/353* (2013.01); *G02B 27/126* (2013.01); *G02F 2001/354* (2013.01)
USPC ......................................................... 372/93

(58) Field of Classification Search
CPC ... G02F 1/353; G02F 2001/354; H01S 3/109; H01S 3/083; G02B 27/126
USPC ......................................................... 372/22
See application file for complete search history.

(56) References Cited

U.S. PATENT DOCUMENTS 5,625,633 A * 4/1997 Ichimura et al. ............... 372/32
2010/0309936 A1 * 12/2010 Lefort et al. .................. 372/11

* cited by examiner

*Primary Examiner* — Tuan Nguyen
(74) *Attorney, Agent, or Firm* — Collard & Roe, P.C.

(57) ABSTRACT

A device for generating electromagnetic radiation includes a light source (1) generating a first radiation (7) at a fundamental wavelength, an optical resonator (2) in which the first radiation (7) circulates, and a frequency multiplier (8) located in the optical resonator (2) which converts the first radiation (7) at least partly into a second radiation (9) at a second or higher harmonic wavelength. The frequency multiplier (8) includes at least one non-linear crystal (10). At least one beam splitter element (12) passed through by the first radiation (7) and the second radiation (9) is coupled to the non-linear crystal (10), wherein the first radiation (7) and the second radiation (9) leave the beam splitter element (12) each in a different spatial direction.

8 Claims, 1 Drawing Sheet

DEVICE FOR GENERATING ELECTROMAGNETIC RADIATION

CROSS REFERENCE TO RELATED APPLICATIONS

Figure 1:
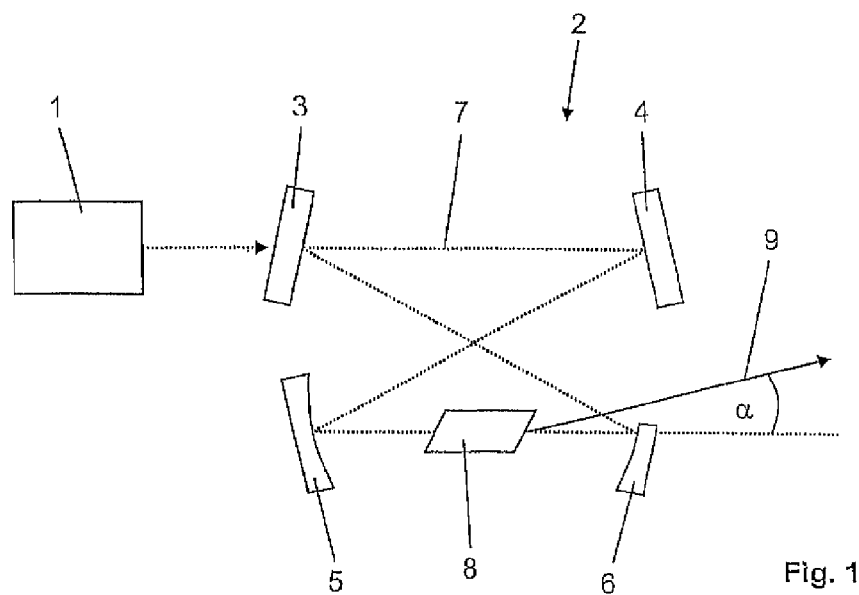

Applicant claims priority under 35 U.S.C. §119 of German Application Nos. 10 2012 018 815.3 filed on Sep. 25, 2012 and 10 2013 001 177.9 filed on Jan. 24, 2013, the disclosures of which are incorporated by reference.

The invention relates to a device for generating electromagnetic radiation, said device comprised of a light source generating a first radiation at a fundamental wavelength, an optical resonator in which the first radiation circulates, and a frequency multiplier located in the resonator which converts the first radiation at least partly into a second radiation at a second or higher harmonic wavelength, the said frequency multiplier comprising at least one non-linear crystal.

Devices of this kind are known from prior state of technology. The radiation from a light source which usually is a laser is coupled into an optical resonator. The optical resonator is resonant at the fundamental wavelength, thus causing an excessive increase of the radiation intensity in the resonator. Located in the resonator is a frequency multiplier charged with the first radiation circulating in the resonator The non-linear crystal of the frequency multiplier features a non-linear susceptibility. This feature is exploited for generating a second radiation from the first radiation at a second or higher harmonic wavelength. To this effect the non-linear crystal of the frequency multiplier is arranged and oriented in the beam path of the resonator corresponding to the phase alignment condition.

More recently, devices have become known that allow for generating electromagnetic radiation in the ultraviolet spectral range (250 nm or less) based upon the afore-mentioned principle. Suitable non-linear crystals, for example, consist of barium borate (BBO) or potassium beryllium fluoroborate (KBBF), too.

Coupling-out the wavelength-converted radiation, i.e. the second radiation from the optical resonator, is usually done by means of a dichroic with prior art devices. There is a problem in that absorption and scattering losses of the ultraviolet radiation in the dichroic become very high with the wavelength combinations occurring on generating wavelength-converted radiation in the ultraviolet spectral range. Besides, it becomes evident that coatings of usually obtainable commercial dichroics are not long-term resistant in the ultraviolet spectral range. It causes degradation of the coating which entails premature failure of the device.

Against this background, it is the object of the present task providing a device for generating wavelength-converted electromagnetic radiation which is capable of generating radiation at the second or higher harmonic wavelength in the ultraviolet spectral range and in which those problems described hereinabove do not occur.

The present invention achieves this object by coupling at least one beam splitter element to the non-linear crystal, said beam splitter element being passed through by the first and the second radiation, with the first and the second radiation each leaving the beam splitter element in a different spatial direction.

The invention is based on using a beam splitter element instead of the hitherto usual dichroic, said beam splitter element causing the first and the second radiation to propagate in different spatial directions. Different spatial directions cause a spatial separation of the first and the second radiation. This separation can be utilized for coupling-out the second radiation from the optical resonator.

Within the non-linear crystal, there is an angle developing between the propagation directions of the first radiation and the second radiation. This angle is also designated as "walk-off" angle. Hence, a spatial separation of the two beams of the first and the second radiation is thus already created in the interior of the non-linear crystal. The first and the second radiation leave the non-linear crystal in conventional devices, i.e. without the inventive beam splitter element, in parallel because the wave vector of the second radiation is collinear to the propagation direction of the first radiation, and because the first and the second radiation are refracted at the crystal/air (or crystal/vacuum) interface on leaving the non-linear crystal. Thus a spatial separation of the first and the second radiation already occurs with conventional devices, but the distances between outgoing beam axes usually only amount to a few 100 μm with a usual thickness of the non-linear crystal of for example 20 millimeters. This slight beam displacement is not sufficient to couple-out the second radiation from the optical resonator. Moreover, it should be considered that the beam ellipsis of the second radiation reaches into the first radiation so that a spatial separation, even it were geometrically possible, would entail substantial performance losses.

In accordance with the invention, a beam splitter element coupled to the non-linear crystal and passed through by the first and the second radiation is implemented now. This beam splitter element is so designed that the propagation directions of the first and the second radiation after leaving the beam splitter element enclose an angle which is greater than 0°, preferably is greater than 5°. The first radiation and the second radiation thus diverge. This can be utilized for coupling-out the second radiation from the optical resonator.

In a preferred embodiment, the optical resonator has two or more reflectors which in accordance with the spatial directions in which the first and the second radiation leave the beam splitter element are so arranged, aligned, and/or shaped that only the first radiation circulates in the optical resonator and that the second radiation leaves the optical resonator. For example, this can be achieved by arranging, aligning and/or shaping at least one of the reflectors in such a manner that it only reflects the first radiation and that the second radiation passes the reflector. For this purpose, a so-called D-Cut mirror can be utilized to serve as reflector. Conceivable is any mirror geometry which only reflects the first radiation and which lets the second radiation pass by.

In a preferred embodiment of the inventive device, the beam splitter element is a body transparent for the first and the second radiation, said body being tied to a surface of the non-linear crystal, with the refractive index of the material of the beam splitter element with the second or higher harmonic wavelength differing from the refractive index of the material of the non-linear crystal. For example, the refractive index of the material of the beam splitter element can be adapted to the refractive index with the fundamental wavelength, while the refractive index of the material of the beam splitter element with the second or higher harmonic wavelength deviates from the refractive index of the material of the non-linear crystal. This causes the first and the second radiation to leave the beam splitter element each in a different spatial direction. The second radiation within the non-linear crystal runs corresponding to the walk-off angle relatively to the first radiation. The second radiation is then refracted on passing over from the non-linear crystal into the beam splitter element, because with the second or higher harmonic wavelength, the refractive indices of the non-linear crystal and in of the material of the beam splitter element are not adapted. This effect is still intensified by another refraction which occurs on the transition from the beam splitter element into ambient air (or into the vacuum).

If the material of the non-linear crystal is a potassium beryllium fluoroborate, for example, then the walk-off angle with a wavelength combination of the fundamental and harmonic wavelength of 382/191 nm is 3.6°. By way of an inventive beam splitter element, the angle between the propagation directions of the first and the second radiation upon leaving the beam splitter element can be increased up to 8 degrees, whereas otherwise the two beams propagate in parallel outside the crystal. After a propagation distance of only 20 millimeters, this results in a beam displacement of more than 2.5 millimeters. This distance is sufficient for an effective separation of the first and the second radiation without incurring any noticeable performance losses.

Preferably the refractive index of the material of the beam splitter element with the fundamental wavelength is smaller than the refractive index of the material of the non-linear crystal. A maximal angle between the propagation directions of the first and the second radiation can be achieved, if the refractive index of the material of the beam splitter element with the higher harmonic wavelength is at the same time higher than the refractive index of the non-linear crystal.

In a practical configuration, the beam splitter element may be a prism which is accordingly transparent with the wavelengths of the first and the second radiation, wherein the refractive indices of the material of the beam splitter element and of the non-linear crystal are harmonized to each other, if possible, in the afore-described manner. The angles of the prism of the beam splitter element can expediently be designed for adjusting the phase alignment condition of the non-linear crystal.

The inventive device is especially suitable for generating electromagnetic radiation in the ultraviolet spectral range, i.e. the fundamental wavelength amounts up to 500 nm, preferably up to 400 nm, with the second or higher harmonic wavelength amounting up to 250 nm, preferably up to 200 nm.

Figure 2:
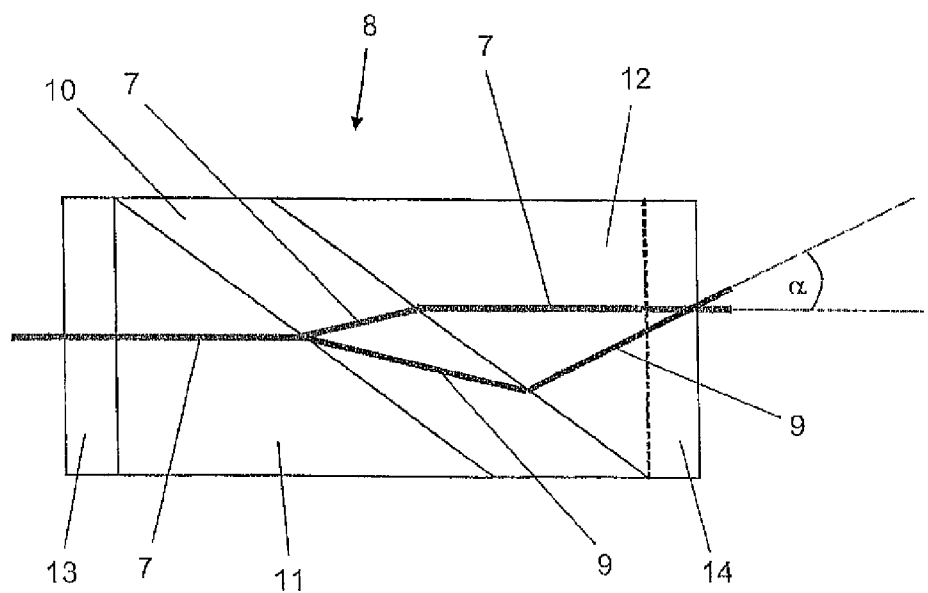

Practical examples of the invention are explained in greater detail in the following based upon drawings, where FIG. 1: is a schematic view of an inventive device;

FIG. 2: is a representation of the beam path in the non-linear crystal and the beam splitter element according to the invention.

FIG. 1 is a schematic view of an inventive device for generating is electromagnetic radiation, comprised of a light source 1. The light source 1 is a laser emitting radiation with a fundamental wavelength in the visible or ultraviolet spectral range, for example at 382 nm. This first radiation is coupled into an optical resonator 2. The depicted practical example is a resonator in a so-called bow-tie arrangement comprised of four reflectors (mirrors) 3, 4, 5 and 6. The first radiation coupled into the resonator 2 is designated with reference number 7. Located in the resonator 2 is a frequency multiplier 8 which converts the first radiation 7 into a second radiation 9 at a second or higher harmonic wavelength, with the frequency multiplier comprising at least one non-linear crystal and a beam splitter element which are not shown more precisely in FIG. 1. The first and the second radiation 7, 9 leave the frequency multiplier 8 in different spatial directions as indicatively shown in FIG. 8. The propagation directions of the first radiation 7 and the second radiation 9 enclose an angle α at the exit of the frequency multiplier 8. The mirror 6 as indicatively shown in FIG. 1 is so shaped that it only reflects the first radiation 7 and that it lets the second radiation 9 pass by. In this manner, it is achieved that only the first radiation 7 circulates in the resonator 2, whereas the second radiation 9 leaves the resonator 2.

FIG. 2 is a detailed view of the frequency multiplier 8 of the inventive device, representing the path of the first radiation 7 and of the second radiation 9 within the frequency multiplier 8. The actual non-linear crystal which is a KBBF crystal is designated with reference number 10. On the radiation input and output, one prism 11 and/or 12 each are tied to the non-linear crystal 10, e.g. by way of purely optical contacting or by using appropriate adhesives or liquids forming the the transition between the crystal 10 and the prisms 11 and 12, respectively. The angles of the prisms 11 and/or 12 at the beam entrance and exit side are so chosen that the phase alignment condition is fulfilled. Accordingly, the non-linear crystal 10 converts the first radiation 7 with the fundamental wavelength of 382 nm into a second radiation with the second harmonic wavelength of 191 nm.

FIG. 2 indicatively shows that the prisms 11 and 12 at the radiation entrance and/or exit have end facets 13 and/or 14 so that the radiation enters and/or leaves under the Brewster angle.

The radiation entering from the left into the frequency multiplier 8 is refracted at the interface between the prism 11 and the non-linear crystal 10. As can be seen, the material of the non-linear crystal 10 with the fundamental wavelength has a greater refractive index than the material of the prism 11. The second radiation 9 is generated in the non-linear crystal 10 by way of frequency conversion. Corresponding to the walk-off angle, the first radiation 7 and the second radiation 9 propagate in the non-linear crystal 10 in different directions. Refraction again occurs at the interface between the non-linear crystal 10 and the prism 12. In prism 12, the propagation direction of the first radiation 7 again runs in parallel to the propagation direction of the first radiation 7 when entering into the frequency multiplier 8. The refractive index of the prism 12 with the higher harmonic wavelength of the second radiation 9 is greater than the refractive index of the material of the crystal 10. Its effect is that a renewed refraction occurs as shown in FIG. 2 so that finally the angle α develops between the first radiation 7 and the second radiation 9. The prism 12 represents a beam splitter element in the sense of the invention.

It should still be noted that the schematic view of FIG. 1 does not accurately reflect reality for lack of a different possibility of display. The beam plane within the resonator in FIG. 1 and the plane of the section through the frequency multiplier 8 shown in FIG. 2 are vertical to each other. It means that the second radiation 9 as shown in FIG. 1 does not lie in the beam plane within the resonator 2 but is deflected out from this plane (from the display plane of FIG. 1 towards the front or rear) The propagation directions of the first radiation 7 and the second radiation 9, as outlined hereinabove, enclose an angle α at the exit of the frequency multiplier 8. This is the angle between the beam plane within the resonator 2 (of the display plane) and the second radiation 9. As has been outlined hereinabove, the mirror 6 is so shaped that it only reflects the first radiation 7 and lets the second radiation 9 pass by. To this effect, the mirror 6 in a position lying at the front or rear relative to the display plane of FIG. 1 may have an appropriate recess or be cut off (i.e. not at its upper end in the display plane as indicatively shown in FIG. 1).

The invention claimed is:

1. Device for generating electromagnetic radiation, said device comprised of a light source (1) generating a first radiation (7) at a fundamental wavelength, an optical resonator (2) in which the first radiation (7) circulates, and a frequency multiplier (8) located in the resonator (2) which converts the first radiation (7) at least partly into a second radiation (9) at a second or higher harmonic wavelength, wherein the said frequency multiplier (8) comprises at least one non-linear crystal (10) wherein at least one beam splitter element (12) passed through by the first radiation (7) and the second radiation (9) is coupled to the non-linear crystal (10), wherein the first radiation (7) and the second radiation (9) leave the beam splitter element (12) each in a different spatial direction, wherein the resonator (2) comprises two or more reflectors (3, 4, 5, 6) which according to the spatial directions in which the first and the second radiation (7, 9) leave the beam splitter element (12) are so arranged, aligned and/or shaped that only the first radiation (7) circulates in the optical resonator (2) and the second radiation (9) leaves the optical resonator (2), wherein at least one of the reflectors (6) is so arranged, aligned or shaped that it only reflects the first radiation (7) and wherein the second radiation (9) passes the reflector.

2. Device according to claim 1, wherein the beam splitter element (12) is a body transparent to the first and second radiation (7, 9), said body tied to a surface of the non-linear crystal (10), wherein the refractive index of the material of the beam splitter element (12) with the second or higher harmonic wavelength differs from the refractive index of the material of the non-linear crystal (10).

3. Device according to claim 2, wherein the refractive index of the material of the beam splitter element (12) with the fundamental wavelength is smaller than the refractive index of the material of the non-linear crystal (10).

4. Device according to claim 2, wherein the refractive index of the material of the beam splitter element (12) with the second or higher harmonic wavelength is greater than the refractive index of the material of the non-linear crystal (10).

5. Device according to claim 1, wherein the beam splitter element (12) is a prism.

6. Device according to claim 1, wherein the material of the non-linear crystal (10) is barium borate (BBO) or a potassium beryllium fluoroborate (KBBF).

7. Device according to claim 1, wherein the fundamental wavelength amounts up to 500 nm, wherein the second or higher harmonic wavelength amounts up to 250 nm.

8. Device according to claim 1, wherein the spatial directions in which the first and the second radiation (7, 9) leave the beam dividing element (12) enclose an angle $\alpha$ of at least 5°.

* * * * *